(12) United States Patent
Shahmehri et al.

(10) Patent No.: US 10,922,811 B2
(45) Date of Patent: Feb. 16, 2021

(54) OBJECT DIFFERENTIATION AND IDENTIFICATION

(71) Applicant: Ford Global Technologies, LLC, Dearborn, MI (US)

(72) Inventors: Babak Shahmehri, Canton, MI (US); Xiaodong Zhang, Northville, MI (US); Carlene Bills, Ypsilanti, MI (US); Farhan Javed, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 24 days.

(21) Appl. No.: 16/404,383

(22) Filed: May 6, 2019

(65) Prior Publication Data

US 2020/0357105 A1   Nov. 12, 2020

(51) Int. Cl.
| | |
|---|---|
| G06K 9/00 | (2006.01) |
| G06T 7/00 | (2017.01) |
| G06T 7/529 | (2017.01) |
| G06T 7/90 | (2017.01) |
| G06T 7/10 | (2017.01) |
| G06N 3/02 | (2006.01) |
| G06K 9/78 | (2006.01) |
| G06T 7/49 | (2017.01) |
| B60J 3/02 | (2006.01) |

(52) U.S. Cl.
CPC ............... *G06T 7/001* (2013.01); *G06K 9/78* (2013.01); *G06N 3/02* (2013.01); *G06T 7/10* (2017.01); *G06T 7/49* (2017.01); *G06T 7/529* (2017.01); *G06T 7/90* (2017.01); *B60J 3/0217* (2013.01); *G06T 2207/20084* (2013.01)

(58) Field of Classification Search
CPC combination set(s) only.
See application file for complete search history.

(56) References Cited

U.S. PATENT DOCUMENTS

| | | | |
|---|---|---|---|
| 6,111,984 A | * | 8/2000 | Fukasawa ............ G06K 9/6206 382/194 |
| 7,522,163 B2 | | 4/2009 | Holmes |
| 9,218,626 B1 | | 12/2015 | Haller, Jr. et al. |
| | | | (Continued) |

OTHER PUBLICATIONS

US 9,547,941 B2, 01/2017, Wang et al. (withdrawn)
(Continued)

*Primary Examiner* — Alex Kok S Liew
(74) *Attorney, Agent, or Firm* — Brandon Hicks; Bejin Bieneman PLC

(57) ABSTRACT

A system includes a computer programmed to detect a first and a second object in received image data, determine a mesh of cells on each of the first and second object surface, upon identifying a cell of the mesh on the first object mismatched to a corresponding cell on the second object to refine the mismatched cell to a plurality of cells, wherein identifying the mismatch is based on a at least one of a mismatch in a color, texture, shape, and dimensions, stop refining the cell upon determining that a refinement of the refined cell of the first object results in a refined cell that is matched to a corresponding refined cell of the second object, and output location data of mismatched cells of the first and second objects. A mismatched cell has at least one of a color mismatch, texture mismatch, and shape mismatch.

18 Claims, 11 Drawing Sheets

(56) References Cited

U.S. PATENT DOCUMENTS

| | | |
|---|---|---|
| 9,676,386 B2 | 6/2017 | Remillard et al. |
| 9,999,509 B2 | 6/2018 | Dikovsky et al. |
| 2015/0170005 A1* | 6/2015 | Cohen ................. G06F 16/7328 |
| | | 382/180 |
| 2017/0236183 A1 | 8/2017 | Klein et al. |
| 2018/0349695 A1* | 12/2018 | Le Henaff ................. G06T 5/40 |

OTHER PUBLICATIONS

"Cloud Vision—Derive insight from your images with our powerful pretrained API models or easily train custom vision models with AutoML Vision[Beta]", www.cloud.google.com/vision/overview/docs.

Nikishaev, "Feature extraction and similar image search with OpenCV for newbies", https://medium.com/machine-learning-world/feature-extraction-and-similar-image-search-with-opencv-fo . . . , Feb. 15, 2018.

\* cited by examiner

OBJECT DIFFERENTIATION AND IDENTIFICATION

BACKGROUND

Technology exists to provide digital data that is a model of an object such as a part designed to be manufactured. For example, a mesh model typically includes vertices, edges, and faces forming polygons, e.g., triangles and quadrilaterals, to provide a three-dimensional representation of an object. However, it is a problem to compare models of different objects, particularly when the different objects have many features in common and relatively minor differences, particularly to do so without consuming too much time and/or computing resources.

DETAILED DESCRIPTION

Introduction

Figure 1:
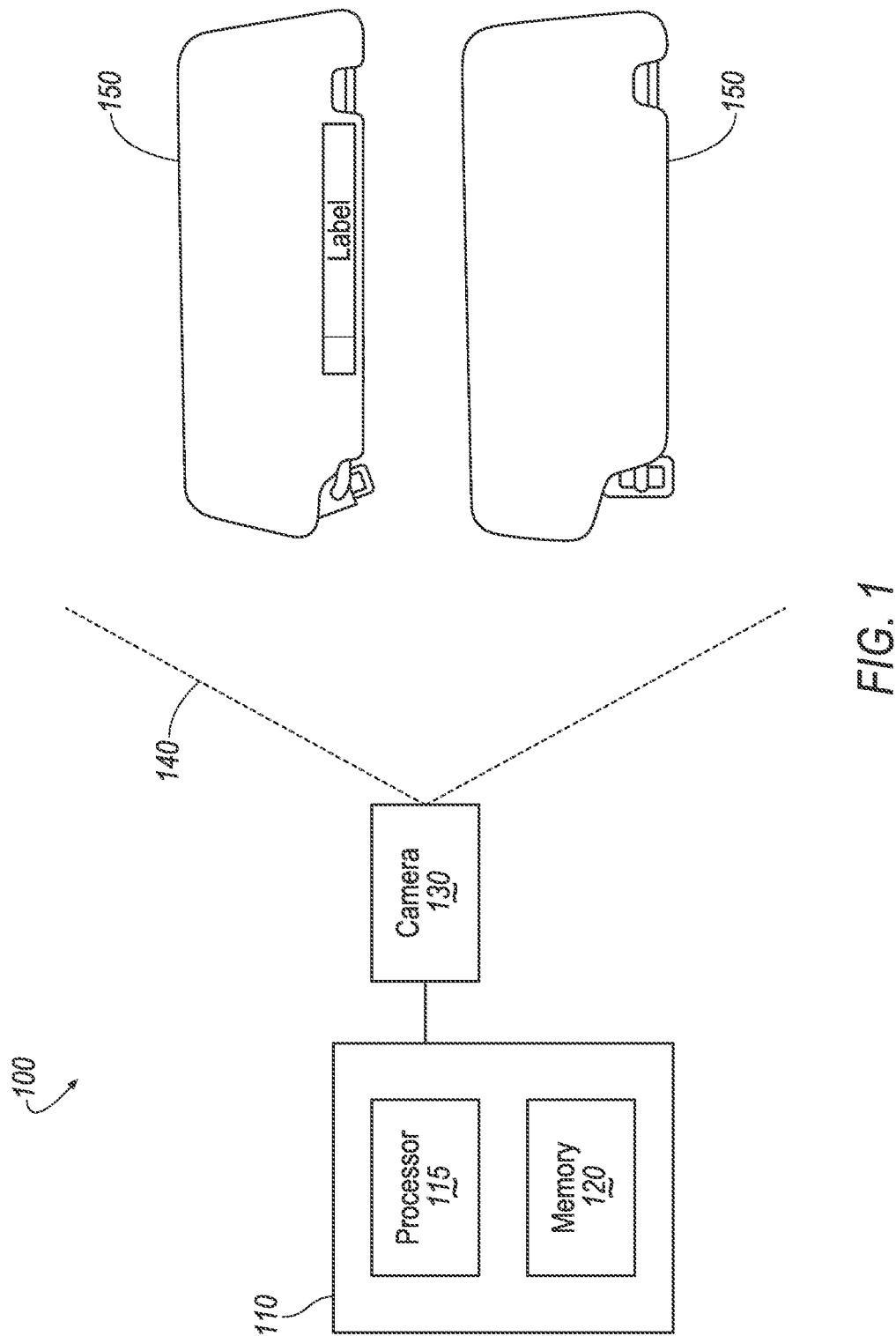
FIG. 1 is a block diagram showing an example computer system for providing object comparisons.

A system includes a computer that includes a processor and a memory. The memory stores instructions executable by the processor such that the computer is programmed to detect a first and a second object in received image data, determine a mesh of cells on each of the first and second object surface, upon identifying a cell of the mesh on the first object mismatched to a corresponding cell on the second object, refine the mismatched cell to a plurality of cells, wherein identifying the mismatch is based on a at least one of a mismatch in a color, texture, shape, and dimensions, stop refining the cell upon determining that a refinement of the refined cell of the first object results in a refined cell that is matched to a corresponding refined cell of the second object, and output location data of mismatched cells of the first and second objects, wherein a mismatched cell has at least one of a color mismatch, texture mismatch, and shape mismatch.

The instructions may further include instructions to identify a mismatch in texture based on a neural network trained by a plurality of textures including leather, faux leather, fabric, and plastic.

The neural network may output, for each cell, a probability of each trained material.

The instructions may further include instructions to identify the mismatch in shape by determining a difference between a first minimal bounding box fitted around a first detected shape on the first object and a second minimal bounding box fitted around a second shape detected in a corresponding cell on the second object.

The instructions may further include instructions to identify the mismatch in shape based on an output of a trained neural network, wherein the received image data is inputted to the trained neural network.

The instructions may further include instructions to identify a first region of interest including a first shape on the first object and a second region of interest including a second shape on the second object and then perform pixel by pixel comparison to identify mismatches of the first and second shape.

The instructions may further include instructions to determine the dimensions mismatch based on a reference scale included in the received image data.

The instructions may further include instructions to superimpose, on the first and second objects, one or more bounding boxes around cells including at least one of a color mismatch, shape mismatch, and texture mismatch.

The instructions may further include instructions to superimpose a heat map on an image of the second objects, wherein each point of the heat map has a color that represents a mismatch quantifier for at least one of a color mismatch, shape mismatch, and texture mismatch.

Further disclosed herein is a method comprising detecting a first and a second object in received image data, determining a mesh of cells on each of the first and second object surface, upon identifying a cell of the mesh on the first object mismatched to a corresponding cell on the second object, refining the mismatched cell to a plurality of cells, wherein identifying the mismatch is based on a at least one of a mismatch in a color, texture, shape, and dimensions, stopping refining the cell upon determining that a refinement of the refined cell of the first object results in a refined cell that is matched to a corresponding refined cell of the second object, and outputting location data of mismatched cells of the first and second objects, wherein a mismatched cell has at least one of a color mismatch, texture mismatch, and shape mismatch.

The method may further include identifying a mismatch in texture based on a neural network trained by a plurality of textures including leather, faux leather, fabric, and plastic.

The neural network may output, for each cell, a probability of each trained material.

The method may further include identifying the mismatch in shape by determining a difference between a first minimal bounding box fitted around a first detected shape on the first object and a second minimal bounding box fitted around a second shape detected in a corresponding cell on the second object.

The method may further include identifying the mismatch in shape based on an output of a trained neural network, wherein the received image data is inputted to the trained neural network.

The method may further include identifying a first region of interest including a first shape on the first object and a second region of interest including a second shape on the second object and then perform pixel by pixel comparison to identify mismatches of the first and second shape.

The method may further include determining the dimensions mismatch based on a reference scale included in the received image data.

The method may further include superimposing, on the first and second objects, one or more bounding boxes around cells including at least one of a color mismatch, shape mismatch, and texture mismatch.

The method may further include superimposing a heat map on an image of the second objects, wherein each point of the heat map has a color that represents a mismatch quantifier for at least one of a color mismatch, shape mismatch, and texture mismatch.

Further disclosed is a computing device programmed to execute any of the above method steps.

Yet further disclosed is a computer program product, comprising a computer readable medium storing instructions executable by a computer processor, to execute any of the above method steps.

System Elements

Comparing similar objects can be challenging, especially doing so efficiently, e.g., in a limited time, e.g., 1 second (s). Examples of similar objects that can be difficult to compare include vehicle parts such as different designs for functionally same parts, such as respective designs for different visors, interior mirrors, electronic circuit boards, etc. To improve both results and efficiency of digital object comparisons, it is disclosed herein to identify differences of two objects based on image data including object surface data. An example system includes a computer that can be programmed to detect a first and a second object in received image data, to determine a mesh of cells on each of the first and second object surface, and upon identifying a cell of the mesh on the first object mismatched to a corresponding cell on the second object, to refine the mismatched cell to a plurality of cells, wherein identifying the mismatch is based on a at least one of a mismatch in a color, texture, shape, and dimensions. The computer can be programmed to stop refining the cell upon determining that a refinement of the refined cell of the first object results in a refined cell that is matched to a corresponding refined cell of the second object, and to output location data of mismatched cells of the first and second objects, wherein a mismatched cell has at least one of a color mismatch, texture mismatch, shape mismatch, and dimensions mismatch.

FIG. 1 shows an example computer system 100 for performing a comparison of first and second objects, e.g., a query object 150 and a reference object 150. A query object 150 can be represented in a first captured image 205 (see FIG. 2) and a reference object 150 can be represented in as second captured image 205. A computer 110 can be programmed to compare the first and second images 205 to determine that a query object 150 substantially matches a reference object 150.

The system 100 may include a computer 110 and a memory 120. The memory or some other data storage included in or coupled to the computer 110 can store object 150 images, e.g., as captured by a digital camera 130 with a field of view 140 that captures images 205 of objects 150 in the visible light spectrum.

The memory 120 includes one or more forms of computer-readable media, and stores instructions executable by the computer 110 for performing various operations, including as disclosed herein.

The computer 110 may execute program instructions to carry out processes, operations, algorithms, etc., as disclosed herein to perform a comparison of images 205 representing respective objects 150 as further discussed below.

The system 100 can include one or more camera sensors 130 that provide image data encompassing a query object 150 and a reference object 150. A camera sensor 130 provides image data to, e.g., the computer 110. The camera sensor(s) 130 may include chips, image sensors, and optical components. The camera sensor(s) 130 may output image data based on the optical signals captured by the image sensor(s) of the camera sensor 130 from an exterior surface of the objects 150. The computer 110 may be programmed to detect object(s) 150 from image data received from the camera sensor(s) 130 and determine various physical properties of the objects 150 such as a shape, color, texture, dimensions, etc., as further discussed with respect to FIGS. 2-6. Additionally or alternatively, the computer 110 may be programmed to receive image data from a second computer, e.g., via the Internet, a local communication network (LAN), etc.

Figure 2:
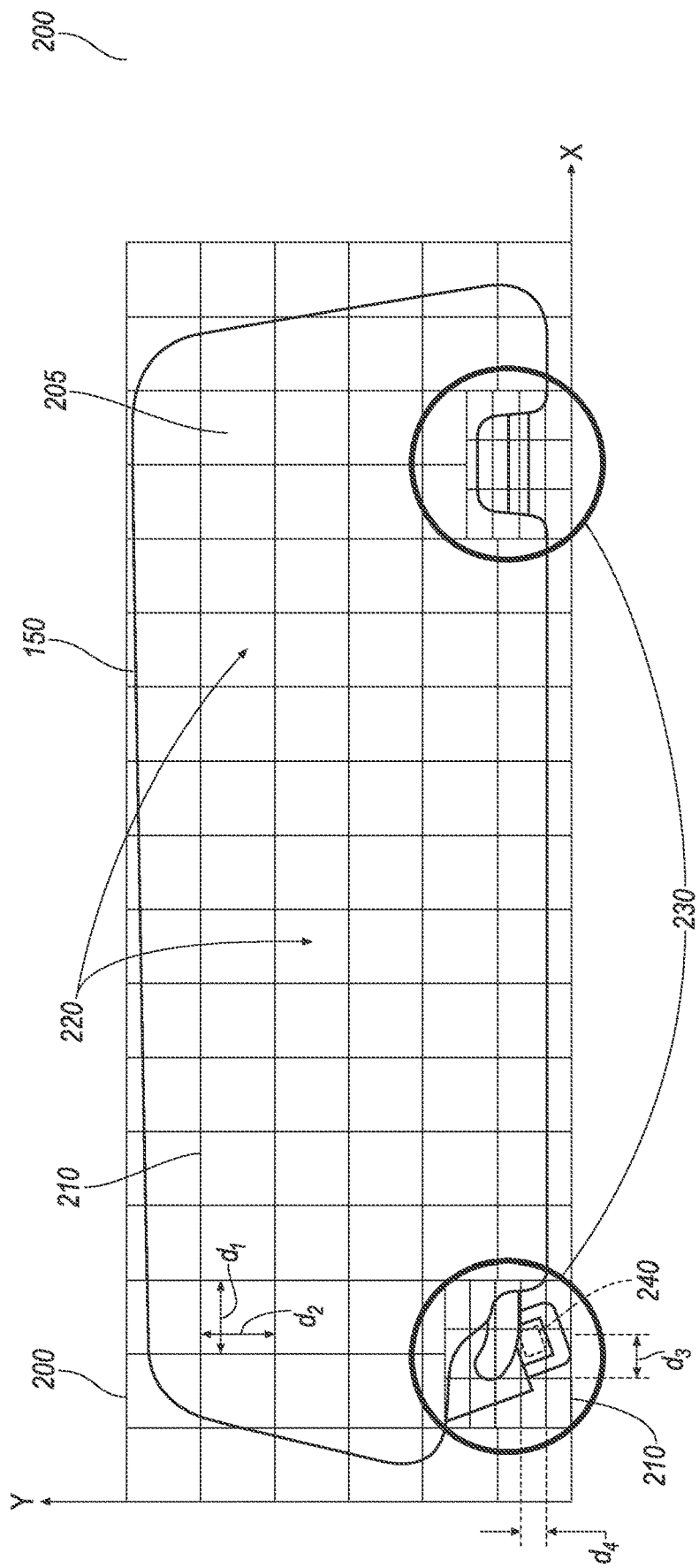
FIG. 2 illustrates a query object with a superimposed mesh refined in areas that differ between the query and reference objects.

FIG. 2 illustrates an image 205 of the query object 150 with a mesh 200 superimposed thereon. The computer 110 may be programmed to generate and superimpose the mesh 200 on the object 150 surface by detecting edges of the object 150 in the received image data. The mesh 200 is a transparent image that is superimposed on the image of, e.g., the object 150. A mesh 200 is a conventional mesh model generated by the computer 110 that includes data providing a geometric representation of an object 150, the data typically including vertices, edges, and faces forming polygons, e.g., triangles and quadrilaterals, to provide a two or three-dimensional representation of an object. A mesh 200 has a plurality of cells 210. A cell 210 defines a polygon and may have a rectangular, square, triangular, etc. shape.

The cells 210 may be arranged at different densities, e.g., a low-density area 220 having cells 210 with dimensions $d_1$, $d_2$ and/or a high-density area 230 having cells 210 with dimensions $d_3$, $d_4$ that are less than at least one of the dimensions $d_1$, $d_2$. A density in the present context is a number of cells 210 included in a specified surface area, e.g., cells/square centimeter ($cm^2$). Thus, reducing cell 210 dimensions increases cell density. In the present context, "refining" one or more cells 210 of a mesh 200 means increasing cell 210 density, e.g., dividing each cell 210 into a number of smaller cells 210, e.g., four cells 210. As discussed below, the computer 110 may be programmed to refine the cells 210 of the mesh 200 based on detected mismatches between the query object 150 and the reference object 150. For example, the computer 110 may be programmed to refine a cell 210 with dimensions $d_1$, $d_2$ by dividing the cell 210 into 4 refined cells 210 with dimensions $$\frac{d_1}{4}, \frac{d_2}{4}.$$

Each cell 210 may be identified with a set of x, y coordinates in a two-dimensional (2D) Cartesian coordinate system that has an origin at a specified point in a mesh 200, e.g., a lowest and leftmost point, and that defines locations on a mesh 200 two-dimensional image plane, e.g., by coordinates that identify respective vertices of the cell 210 or that defines a location of a reference point, e.g., a geometrical center-point of a square, of a cell 210 with respect to an origin of the coordinate system.

Figure 3:
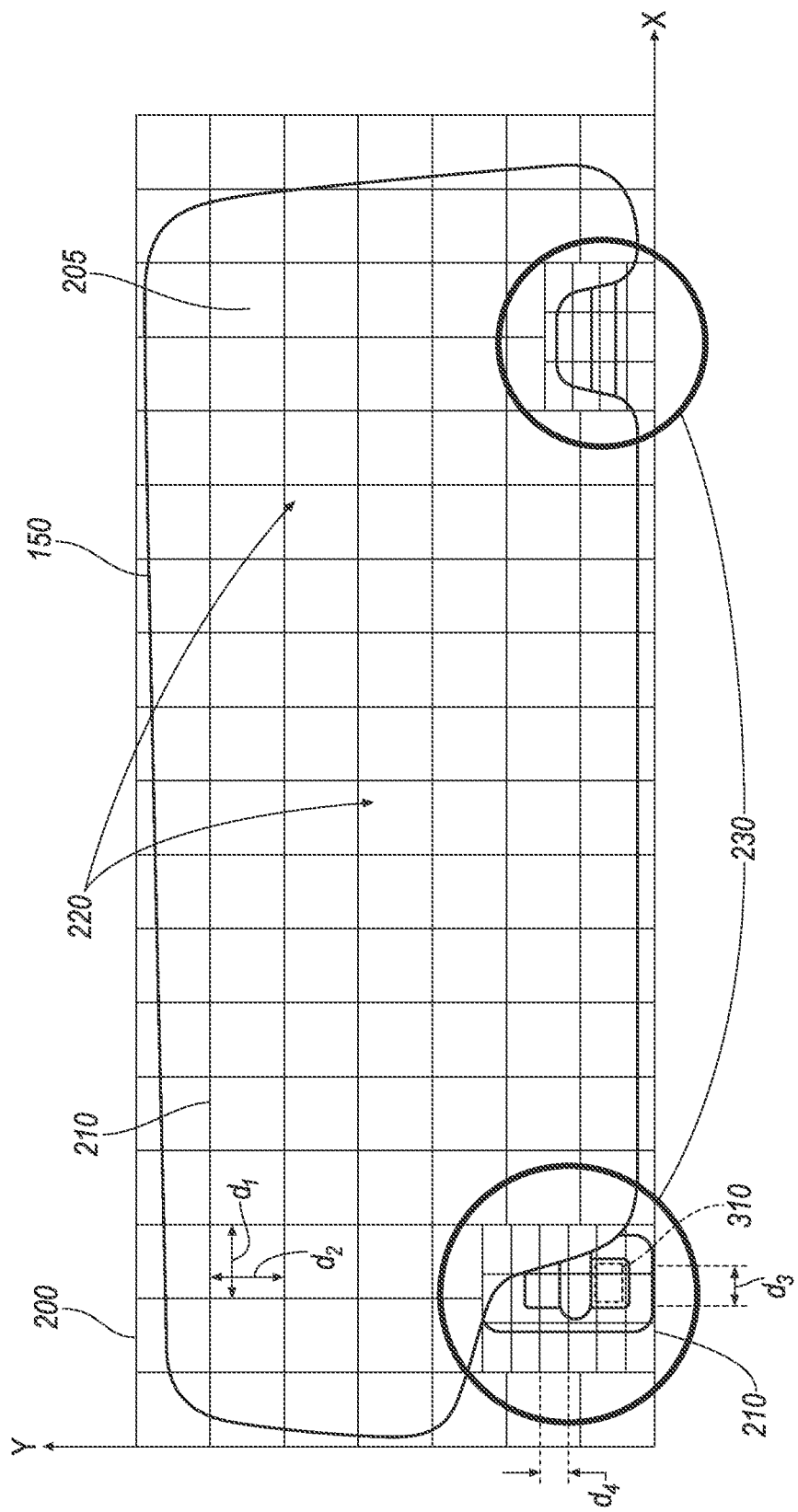
FIG. 3 illustrates a reference object with the mesh of FIG. 2.

FIG. 3 shows an image 300 of a reference object 150 with the mesh 200 including a low-density area 220 and high-density areas 230. The low-density areas 220 are selected as area(s) which match the object 150 surface; high-density areas 230 are selected as areas that do not match the query object 150. In the present context, high and lower densities are defined relative to one another. For example, a low-density area 220 may include cells 210 with dimensions $d_1$, $d_2$, whereas a high-density area 230 may include refined cells 210 with dimensions $d_1/4$, $d_2/4$. As discussed below, the computer 110 may be programmed to increase a density of cells 210 by refining the cells 210 upon determining differences or mismatches between corresponding cells 210 on objects 150.

Two corresponding cells 210 of respective objects 150, are "mismatched" when there is a mismatch in color, texture, shape, and/or dimensions. Corresponding in this context means having substantially same x, y coordinates. Additionally or alternatively, as discussed below, matching or mismatching may be defined in a specific context, e.g., shape mismatch, color mismatch, texture mismatch. As discussed below, a texture in the present context is an image pattern of a material from which an exterior surface of an object 150 is formed. For example, a texture mismatch may be determined as discussed with reference to Equation (5). For example, two corresponding cells 210 of objects 150 may have matching shape and color but having mismatched texture. The computer 110 may be programmed to determine whether the corresponding cells 210 of the objects 150 match based on mismatch quantifiers as discussed below. When the objects 150 have different dimensions and/or shapes, e.g., a shape mismatch quantifier $M_S$ exceeds a threshold, the computer 110 may be programmed to identify a mesh 200 fitted to the object 150 (i.e., each of the cells 210 of the mesh 200 is mapped to a portion of the object 150 surface area) and to superimpose a same mesh 200 of a reference object 150 on a query object 150.

With reference to FIGS. 2 and 3, the computer 110 may be programmed to detect the query and reference objects 150 in received image data, to determine the mesh 200 of cells 210 on each of the query and reference object 150 surfaces, and upon identifying a cell 210 of the mesh 200 on the query object 150 mismatched to a corresponding cell 210 on the reference 150 object, to refine the mismatched cell 210 to a plurality of refined cells 210 (see the areas 230 in FIGS. 2-3), wherein identifying the mismatch is based on an at least one of a mismatch in a color, texture, shape, and dimensions. The computer 110 can be programmed to stop refining the cell 210 upon determining that a refinement of the refined cell 210 of the query object 150 results in a refined cell 210 that is matched to a corresponding refined cell 210 of the reference object 150, and to output location data of mismatched cells 210 of the objects 150.

As discussed above, a shape in the present context is a set of lines and/or curves that describes edges or contours of a part element such as shown in FIGS. 2-3. A shape may be a regular geometrical shape, e.g., a square, triangle, circle, oval, etc., and/or non-geometrical or irregular, e.g., defined by lines of different lengths and/or curvatures. Additionally or alternatively, a shape may be a set of lines, points, curves that are included in an alphabetical letter on an object 150, etc. Thus, the computer 110 may detect a shape mismatch in printed text on objects 150 based on shape of letters without comprehending a meaning of alphabetical text on objects 150.

The computer 110 may be programmed to identify a mismatch in shape by determining a difference between a first minimal bounding box fitted around a first detected shape 240 on the query object 150 and a second minimal bounding box fitted around a second shape 310 detected in a corresponding cell 210 on the reference object 150. For example, the computer 110 may be programmed, based on conventional image analysis techniques such as Minimum Bounding Box, to identify a shape mismatch. The computer 110 may determine a shape mismatch quantifier $M_S$ (x, y) for cells 210 with location coordinates (x, y). In the present context, cells 210 with location coordinates x,y means a first cell 210 with location x,y on the object 150 and a second cell 210 with location coordinates x, y on the object 150. Additionally or alternatively, the computer 110 may be programmed to compare the shapes 240, 310 by performing a pixel by pixel comparison of pixels within the cells 210.

A shape mismatch quantifier $M_S$ may be in a specified range of 0 (matched) to 1 (mismatched). Thus, the computer 110 may store a set of shape mismatch quantifiers $M_S$, e.g., in the form of a table, specifying a shape mismatch quantifier $M_S$ for each cell 210 of the mesh 200. The computer 110 may be programmed to detect shapes in corresponding cells 210 and, based on shape fitting algorithms, edge detection algorithms, etc. to determine the shapes, e.g., triangle, square, non-geometric shapes, etc. and dimensions of the identified shapes. The computer 110 may be programmed to determine a shape mismatch quantifier $M_S$ of 0 (zero) when identified shapes and the dimensions of the identified shapes are same. The computer 110 may be programmed to determine a non-zero value for the shape mismatch quantifier $M_S$ when the detected shapes or the dimensions thereof are not same, e.g., based on example logics of Table 1, a formula, etc. As discussed above, the computer 110 may be programmed to stop refining a cell 210 upon determining that a refinement of the cell 210 results in a refined cell 210 that is matched. For example, the computer 110 may stop refining a cell 210 upon determining that refining of the cell 210 results in at least one refined cell 210 with a mismatch quantifier $M_S$ less than a threshold, e.g., 0.2.

In one example, the computer 110 may be programmed to determine a shape mismatch quantifier $M_S$ based on differences $\Delta s$ of surfaces of bounding boxes fitted around shapes 240, 310 and difference $\Delta \alpha$ of orientation angle of fitted boxes around the compared shapes 204, 310. The computer 110 may be programmed based on Equations (1)-(3) to determine the shape mismatch quantifier $M_S$. $S_1$, $S_2$ represent surfaces of area enclosed by the shapes 204, 310, e.g., specified in number of pixels, square millimeter ($mm^2$), etc. $a_1$, $a_2$ represent orientation angle of shapes, e.g., specified in a range of 0 to 180 degrees relative to X axis of Cartesian coordinate system. For example, the angles $a_1$, $a_2$ may be defined between an axis such as longitudinal axis of the shapes 240, 310 and the X axis of coordinate system. Additionally or alternatively, as discussed below with reference to FIG. 4, the computer 110 may determine a shape mismatch quantifier $M_S$ using a neural network.

$$\Delta s = \frac{|s_1 - s_2|}{s_2} \quad (1)$$

$$\Delta a = \frac{|a_1 - a_2|}{a_2} \quad (2)$$

$$M_s = \begin{cases} \Delta s + \Delta a; & \text{if } \Delta s + \Delta a \leq 1 \\ 1; & \text{if } \Delta s + \Delta a > 1 \end{cases} \quad (3)$$

The computer 110 may be programmed to identify a first area 230 including a first shape 240 on a first or query object 150 and a second area 230 including a second shape 310 on a second or reference object 150 and then to perform pixel by pixel comparison to identify mismatches of the first and second shape 240, 310. An area 230 (or region of interest) for a shape 240, 310 includes a plurality of cells 210 which include at least a pixel of the respective shape 240, 310. A mismatch in shape may further include a mismatch in orientations of the shapes 240, 310 relative to the 2D coordinate system, as shown in FIGS. 2-3.

In one example, to determine dimensions of shapes 240, 310, the computer 110 may be programmed to determine the dimensions, e.g., of bounding boxes around identified shapes, based on a reference included in the image data showing units of measure and/or scale. For example, the received image data may include an image of a reference scale such as a tape measure, a printed scale, etc., within the field of view 140 of the camera sensor 130.

Figure 4:
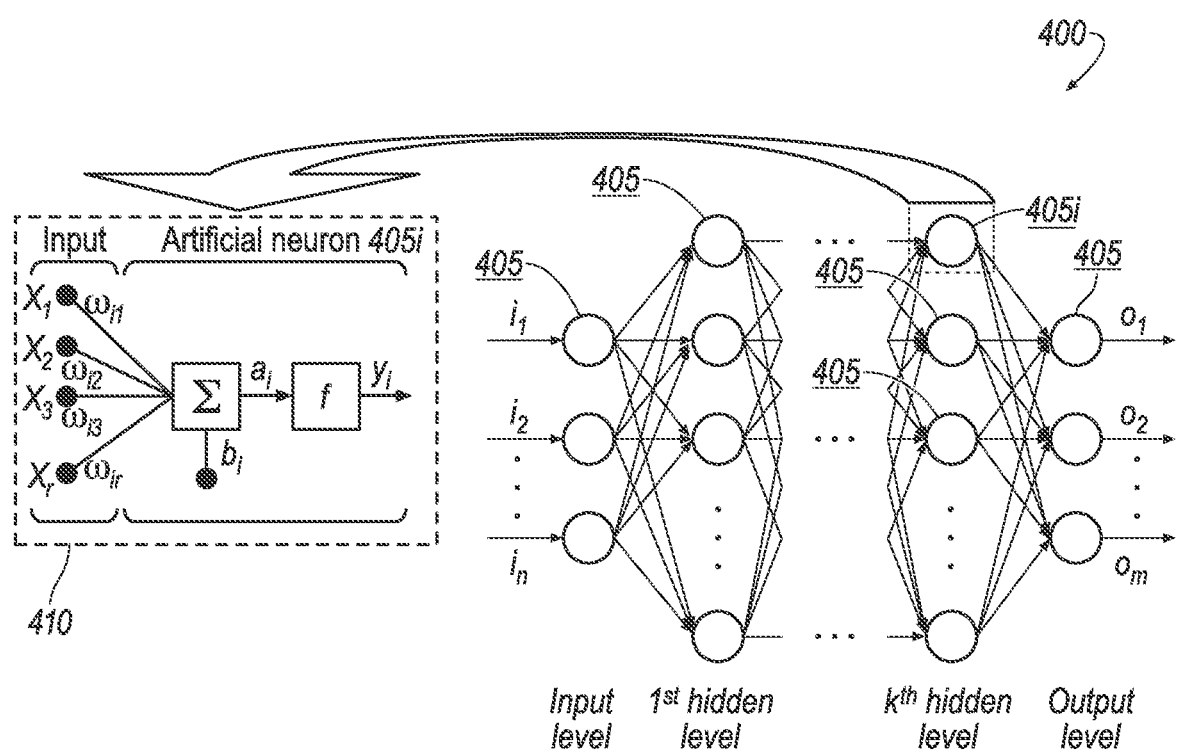
FIG. 4 illustrates an example Deep Neural Network (DNN).

Additionally or alternatively, the computer 110 may be programmed to identify a shape mismatch based on an output of a trained neural network 400 (see FIG. 4). The computer 110 may be programmed based on a neural network such as a Deep Neural Network (DNN 400) to determine a shape mismatch in the received image data. The DNN 400 may be trained to identify and distinguish between shapes. FIG. 4 is a diagram of an example deep neural network (DNN) 400. The DNN 400 can be a software program that can be loaded in memory and executed by a processor included in, e.g., the computer 110. The DNN 400 can include n input nodes 405, each accepting a set of inputs i (i.e., each set of inputs i can include one or more inputs x). The DNN 400 can include m output nodes (where m and n may be, but typically are not, a same number) provide sets of outputs $o_1 \ldots o_m$. The DNN 400 includes a plurality of layers, including a number k of hidden layers, each layer including one or more nodes 405. The nodes 405 are sometimes referred to as artificial neurons 405, because they are designed to emulate biological, e.g., human, neurons. A neuron block 410 illustrates inputs to and processing in an example artificial neuron 405i. A set of inputs $x_1 \ldots x_r$ to each neuron 405 are each multiplied by respective weights $w_{i1} \ldots w_{ir}$, the weighted inputs then being summed in input function $\Sigma$ to provide, possibly adjusted by a bias $b_i$, net input $a_1$, which is then provided to activation function $f$, which in turn provides neuron 405i output $y_i$. The activation function $f$ can be a variety of suitable functions, typically selected based on empirical analysis. As illustrated by the arrows in FIG. 4, neuron 405 outputs can then be provided for inclusion in a set of inputs to one or more neurons 405 in a next layer.

The DNN 400 can be trained to accept as input image data, e.g., camera image data from the sensor(s) 130, and to output a shape mismatch quantifier $M_S$. The DNN 400 can be trained with ground truth data, i.e., data about a real-world condition or state, possible examples of which are discussed below. Weights w can be initialized by using a Gaussian distribution, for example, and a bias b for each node 405 can be set to zero. Training the DNN 400 can including updating weights and biases via conventional techniques such as back-propagation with optimizations.

A set of weights w for a node 405 together are a weight vector for the node 405. Weight vectors for respective nodes 405 in a same layer of the DNN 400 can be combined to form a weight matrix for the layer. Bias values b for respective nodes 405 in a same layer of the DNN 400 can be combined to form a bias vector for the layer. The weight matrix for each layer and bias vector for each layer can then be used in the trained DNN 400.

Training may be an iterative operation. In one example, the computer 110 may be programmed to perform an iterative training until an error, i.e., a difference between an expected output (based on training data) relative to an output from the trained DNN 400, is less than a specified threshold, e.g., 10%. In the present context, shape ground truth data may include a set of shapes, e.g., 50 ground truth images, each image including two shapes, and a mismatch quantifier $M_S$ for the two shapes. Thus, the training data may include set of shapes that entirely match ($M_S=0$), set of shapes that partially match ($0<M_S<1$), and set of shapes that do not match ($M_S=1$). For example, the threshold for determining whether the DNN 400 is trained, may be a maximum permitted deviation from an expected quantifier $M_S$. Additionally or alternatively, a neural network, e.g., the DNN 400, may be trained to identify a texture and/or material of each cell 210 on the exterior surface of the object(s) 150. For example, texture ground truth data may include images of materials with different textures, e.g., fabric, leather, etc., and corresponding texture identifier. Additionally or alternatively, a neural network, e.g., the DNN 400, may be trained to detect the color of the object 150 at each cell 210. The color ground truth data may include a set of images with different colors and corresponding color code, e.g., HSV code.

Figure 5:
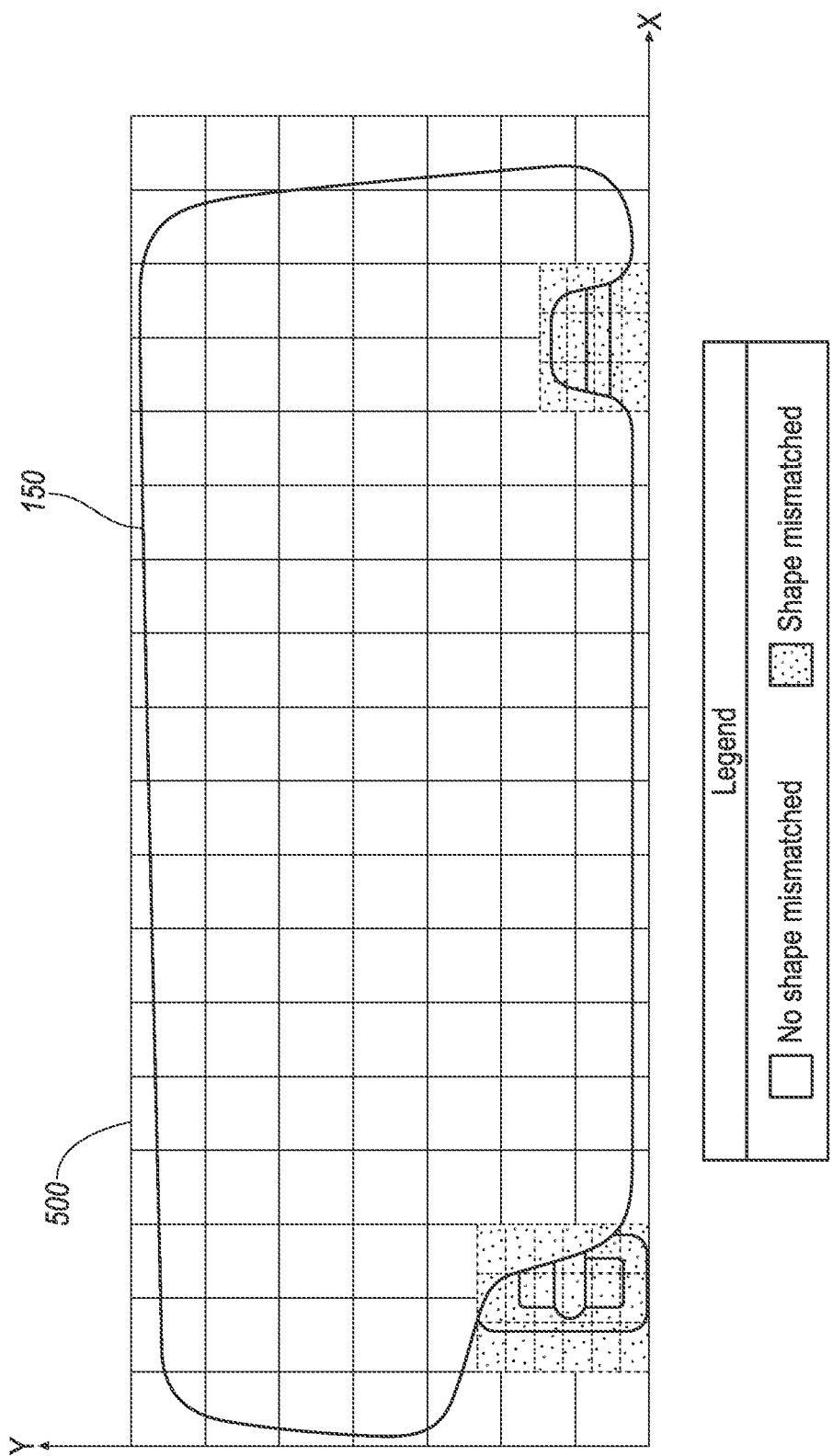
FIG. 5 illustrates a reference object with a superimposed heat map showing areas with geometrical differences.

FIG. 5 illustrates the reference object 150 with a superimposed heat map 500 (or geometrical heat map 500) showing areas with geometrical differences. A heat map is a representation of data in the form of a map or diagram in which data values are represented as colors, shades, grids, etc. In the present context, the heat map 500 may be generated based on the shape mismatch quantifier $M_S$. Additionally or alternatively, as discussed below, a heat map 500 may be generated based on a color mismatch quantifier $M_C$, a texture mismatch quantifier $M_T$, etc. For example, the computer 110 may be programmed to represent (i) cells 210 with a mismatch quantifier, e.g., shape mismatch quantifier $M_S$, less than 0.2 with blue, (ii) cells 210 with a mismatch quantifier between 0.2 and 0.7 with yellow, and (iii) cells 210 with a mismatch quantifier greater than 0.7 with red color. FIG. 5 shows various colors with different shades of a gray color.

Figure 6:
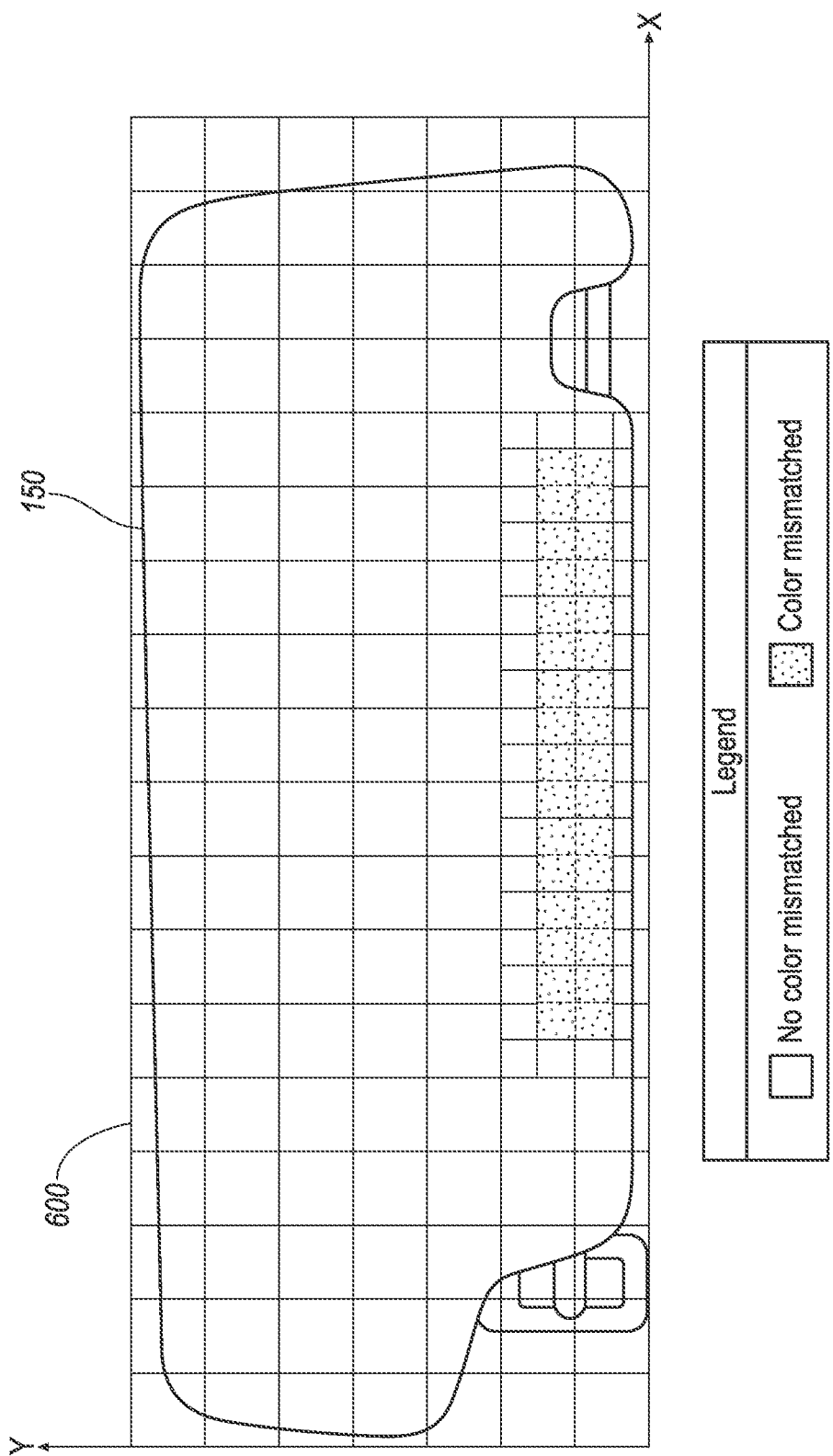
FIG. 6 illustrates the reference object with a superimposed heat map showing areas of color differences.

The computer 110 may be programmed to superimpose a heat map 500 on an image of the reference object 150. Each point of the heat map 500 may have a color, shade, etc., which represents the corresponding mismatch quantifier, e.g., the shape mismatch quantifier $M_S$, color mismatch quantifier $M_C$, and/or texture mismatch quantifier $M_T$. With reference to FIG. 6, the computer 110 may be programmed to superimpose an example heat map 600 (or color mismatch heat map 600) on the image of the reference object 150 showing areas of the reference object 150 with color differences relative to the query object 150.

In one example, the computer 110 may be programmed to determine a color mismatch quantifier $M_C(x, y)$ for each cell 210 of the mesh 200 that specifies a color mismatch of the objects 150 at the location (x, y) of the mesh 200. For example, the computer 110 may be programmed to determine a hue, saturation, value (HSV) code for color of each cell 210. Thus, the computer 110 may determine a first HSV code for a cell 210 at location (x, y) on the query object 150 and a second HSV code for the corresponding cell 210 on the reference object 150. In the present context, an HSV code for a cell 210 may be an average of HSV codes for a plurality of points within the respective cell 210. Then, the computer 110 may determine a color mismatch quantifier $M_C$ for the cell 210 based on the respective first and second HSV codes. The computer 110 may determine that cells 210 at location x,y of objects 150 are "color mismatched" upon determining that the color mismatch quantifier $M_C(x, y)$ exceeds a threshold.

The computer 110 may be programmed to compute a 3D histogram of HSV codes based on quantization of each cell 210 of the mesh 200 into a plurality of bins. For instance, a cell 210 may be divided into 72 bins representing 8 bins for H, 3 for S, and 3 for V, i.e., 8×3×3=72. For each pixel in cell 210, the computer 110 may determine H, S, and V codes (or values) and create a histogram representing distribution of color for that cell 210 by assigning values to bins. The computer 110 may be programmed to compare a distribution of cell 210 HSV codes of objects 150 based on example Equation (4). Q represents a histogram of query object 150 cell 210. T represents a histogram of reference object 150 cell 210, and n is a number of bins.

$$M_c = 1 - \frac{\sum_{j=1}^{n} \min(Q_j, T_j)}{\sum_{j=1}^{n} T_j} \quad (4)$$

As discussed above, the computer 110 may be programmed to identify a texture mismatch $M_T$. Different materials may have different textures with different visual patterns. The computer 110 may determine a texture based on image pattern of the respective texture. For example, a computer 110 may identify a material of the area of cell 210 based on a detected texture of the material. The computer 110 may be programmed to detect a texture on the exterior surface of the objects 150 using image processing techniques. Additionally, the computer 110 may identify a material based on the identified texture on an object 150.

In one example, the computer 110 may be programmed to identify a mismatch in texture based on a neural network trained to detect a texture using image data. For example, the computer 110 may be programmed to train the DNN 400 based on texture ground truth data to identify various textures such as leather, faux leather, fabric, and plastic. In one example, the ground truth data may include a set of images, e.g., 50 images, of various types of leather, faux leather, fabric, plastic, paper, etc. The DNN 400 receives the images of each texture and the corresponding texture identifier.

The computer 110 may be programmed to identify the texture of the exterior surface of the objects 150 based on an output of the trained DNN 400. In one example, the trained DNN 400 may output, for each cell 210, a probability of each trained material. In the present context, a "trained material" is a material that the DNN 400 is trained to detect based on the texture ground truth data. For example, the trained DNN 400 may output for a cell 210 probability values: 0.1 of being plastic, 0.5 probability of being leather, and 0.9 probability of being fabric. The computer 110 may be programmed to determine the surface of the object 150 at the cell 210 to be formed of fabric (i.e., the texture with a maximum probability between 0.1, 0.5, and 0.9).

Figure 7:
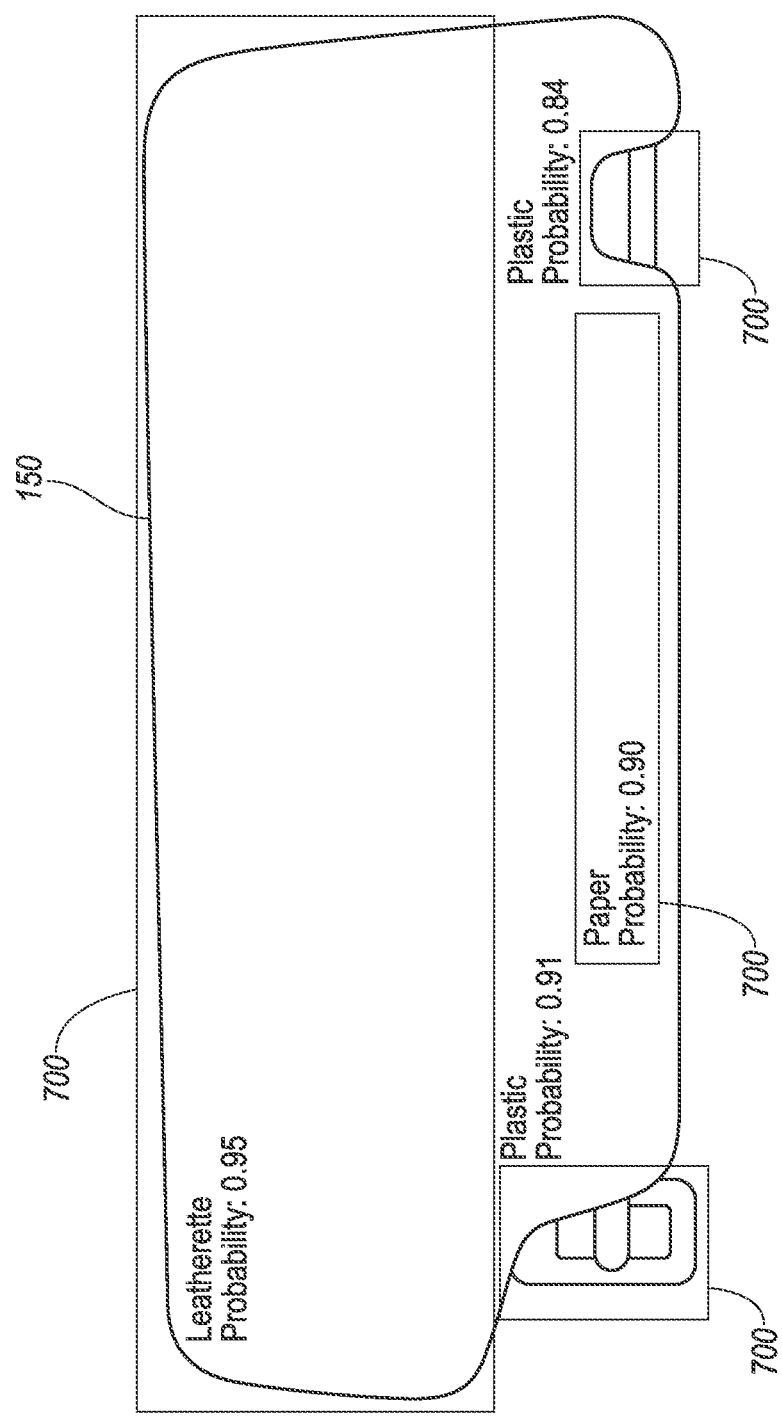
FIG. 7 illustrates identified texture for each portion of the reference object.

As shown in FIG. 7, the computer 110 may be programmed to identify a probability of a texture in each portion of the objects 150 based on the output of the DNN 400. The computer 110 may be programmed to superimpose a bounding box 700 around a plurality of cell 210 with a same texture. The computer 110 may be programmed to determine a texture mismatch for a cell 210 upon determining that a determined texture of the objects 150 at the location x, y of the cell 210 do not match.

The computer 110 may be programmed to determine the texture of each cell 210 of the query object 150 based on the output of the DNN 400. Additionally or alternatively, the computer 110 may be programmed to determine the texture of the query object 150 based on data stored in the computer 110 memory 120. In one example, the computer 110 may store a database including the material and/or texture of query objects 150. For example, the computer 110 may store information pertaining to texture and/or material of each location of the query object 150, e.g., a texture name or identifier associated with each location x, y on the surface of the object 150. For example, the location coordinates x, y may be with respect to the Cartesian coordinate system shown in FIG. 2.

The computer 110 may be programmed to determine a texture mismatch quantifier $M_T$ for each cell 210 of the mesh 200 on the reference object 150. In one example, the computer 110 may be programmed, based on Equation (5), to determine a texture mismatch quantifier $M_T(x, y)$ for location coordinates x, y based on a first texture probability $p_q(x, y)$ and first texture identifier $t_q$, e.g., fabric, for a cell 210 on the query object 150 and a second probability $p_c(x, y)$ and a second texture identifier $t_c$, e.g., plastic, for the cell 210 on the reference object 150. The computer 110 may be programmed to determine that the cells 210 at location x, y of objects 150 have a "texture mismatch" upon determining that the corresponding texture mismatch quantifier $M_T(x,y)$ exceeds a threshold, e.g., 0.5.

$$M_T(x, y) = \begin{cases} 1 & \text{if } t_c(x, y) \text{ not equal} t_q(x, y) \\ |p_q(x, y) - p_c(x, y)| & \text{if } t_c = t_q \end{cases} \quad (5)$$

Additionally or alternatively, the computer 110 may be programmed to superimpose, on the first and/or second objects 150, one or more bounding boxes 700 around cells 210 with a color mismatch, shape mismatch, and/or texture mismatch. For example, the computer 110 may be programmed to identify cells 210 with a mismatch quantifier $M_C$, $M_T$, $M_S$ greater than a threshold, e.g., 0.5, and to superimpose a bounding box 700 around the respective cell 210 (not shown).

Figure 8:
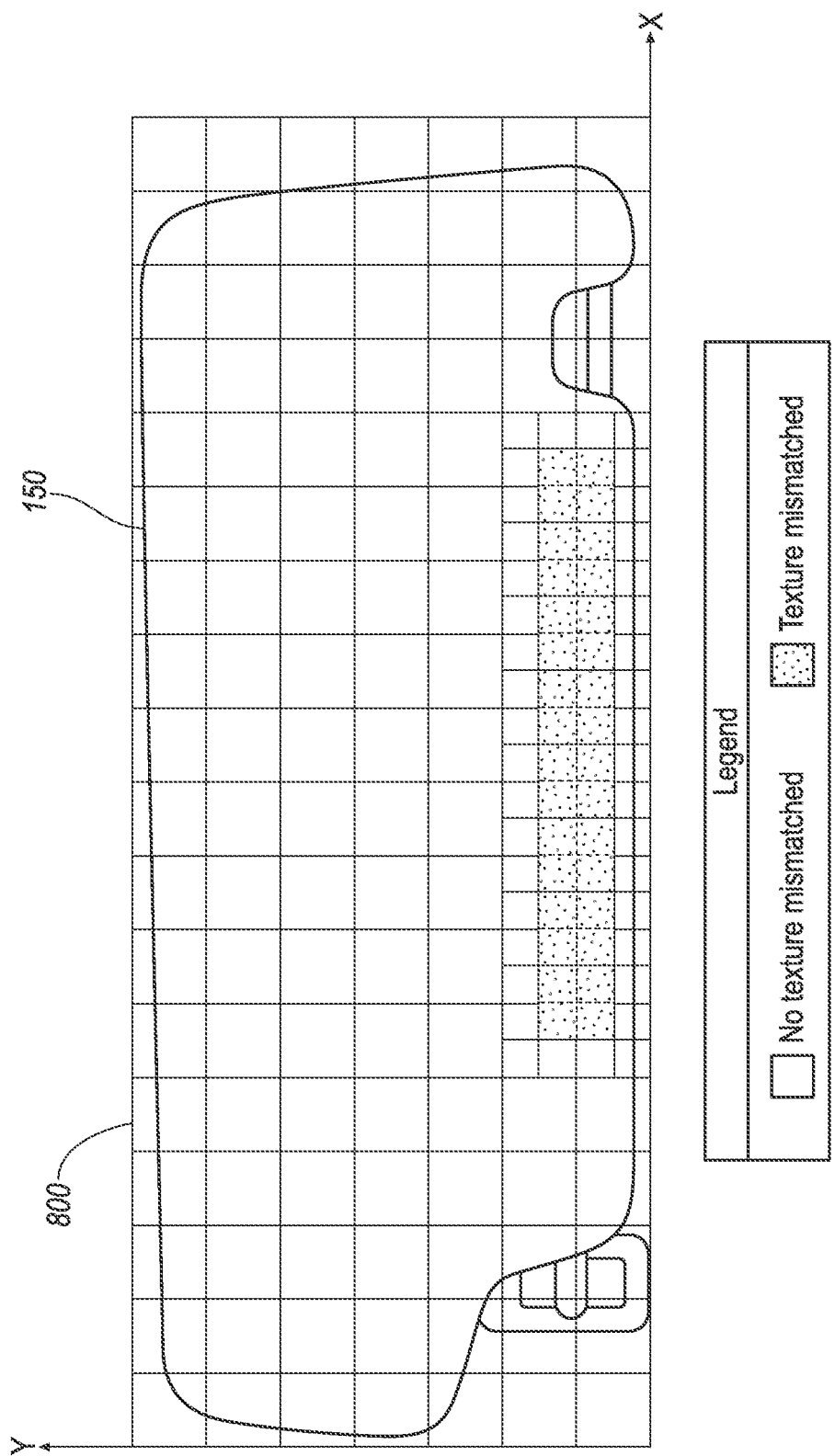
FIG. 8 illustrates superimposed bounding boxes around areas of the reference object with texture differences of reference to the query object.

In one example shown in FIG. 8, the computer 110 may be programmed to superimpose a heat map 800 (or texture mismatch heat map 800) based on the texture mismatch quantifier $M_T(x,y)$ on the object 150 (and/or the object 150). As discussed above, the computer 110 may determine a color, shade, etc. for the heat map 800 at each location based on the determined mismatch quantifier $M_T(x,y)$. For example, the computer 110 may be programmed to represent (i) cells 210 with a mismatch quantifier, e.g., shape mismatch quantifier $M_T$, less than 0.2 with blue, (ii) cells 210 with a mismatch quantifier between 0.2 and 0.7 with yellow, and (iii) cells 210 with a mismatch quantifier greater than 0.7 with red color. FIG. 8 shows various colors with different shades of a gray color.

As discussed above, the computer 110 may superimpose a heat map 500, 600, 800 based on one of a shape mismatch, color mismatch, or texture mismatch. Additionally or alternatively, the computer 110 may be programmed to superimpose a heat map based on a combination, i.e., two or more, of shape mismatch, color mismatch, and/or texture mismatch (such heat map 500, 600, 800 may be referred to as a hybrid heat map). For example, the computer 110 may be programmed to determine a heat map color for a cell 210 at the location coordinates (x,y) based on Equation (6). An operation f shown in expression (6) below is a mapping of a mismatch quantifier and a color represented on a heat map, e.g., quantifier value less than 0.2 represented by blue color, between 0.2 and 0.7 by a yellow color, and greater than 0.7 by red color. Heat map value H(x,y) represents the code of a color displayed at location coordinate (x,y) of the heat map.

$$H(x,y)=f(\text{Max}(M_C(x,y),M_T(x,y),M_S(x,y))) \quad (6)$$

Figure 9:
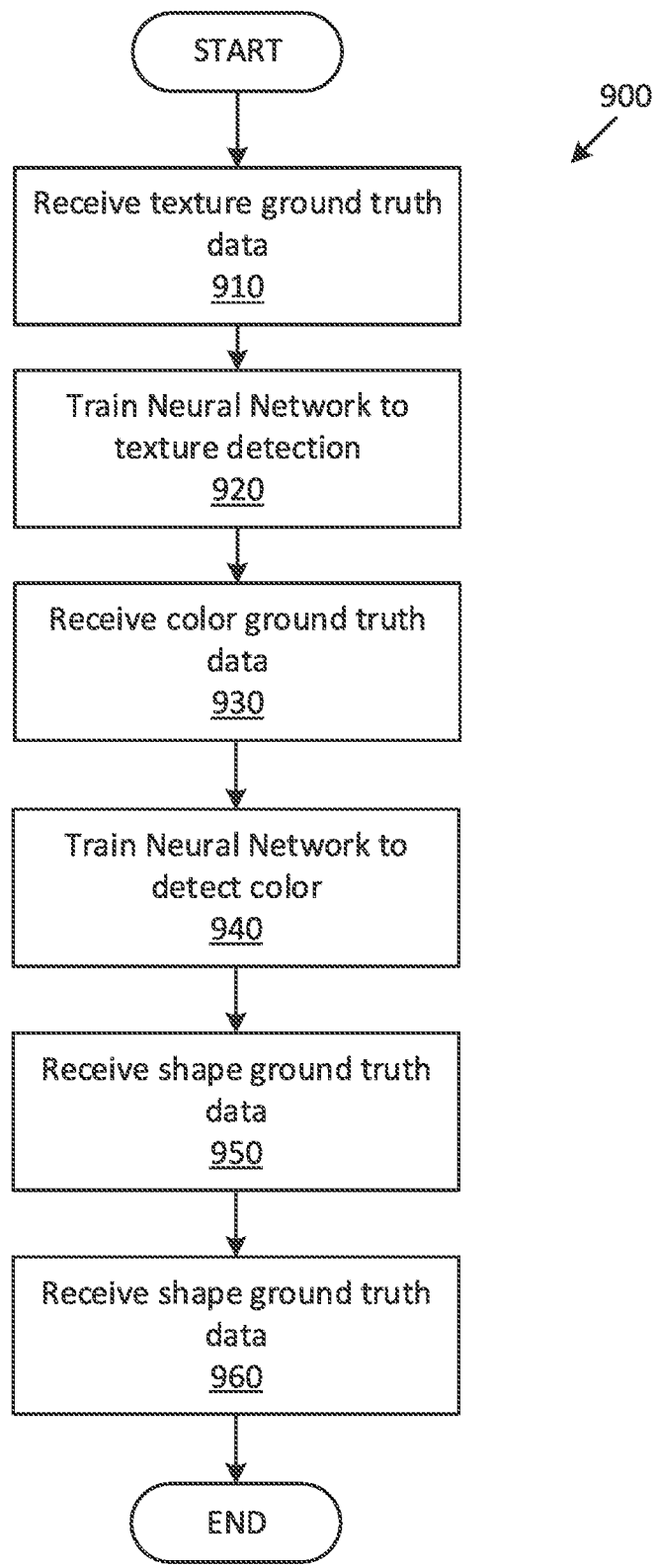
FIG. 9 is a flowchart of an example process for training the Neural Network (NN).

FIG. 9 is a flowchart of an example process 900 for training a neural network such as DNN 400. For example, the computer 110 may be programmed to execute blocks of the process 900.

The process 900 begins in a block 910, in which the computer 110 receives texture ground truth data. The computer 110 may be programmed to receive images of a plurality of materials with different textures, e.g., fabric, leather, etc. and corresponding texture identifier. The ground truth data may be stored in a computer 110 memory 120 and/or received from the camera sensor 130.

Next, in a block 920, the computer 110 trains the neural network, e.g., the DNN 400, to detect a texture. The computer 110 may be programmed to apply the ground truth data to an input of the DNN 400. In one example, the computer 110 may perform an iterative process until a difference between an expected output (based on training data) relative to an output from the trained DNN 400, is less than a specified threshold, e.g., 10%.

Next, in a block 930, the computer 110 receives color ground truth data. The color ground truth data may be stored in a computer 110 memory 120 and/or may be received from the camera sensor 130.

Next, in a block 940, the computer 110 trains the neural network, e.g., the DNN 400 based on color ground truth data. As discussed above, the computer 110 may be programmed to train the DNN 400 to detect a cell 210 color in image data received from the camera sensor 130 by applying the color ground truth data to the DNN 400.

Next, in a block 950, the computer 110 receives shape ground truth data. The shape ground truth data may be stored in a computer 110 memory 120.

Next, in a block 960, the computer 110 trains the neural network, e.g., the DNN 400, to detect the shapes in image data received from the camera sensor 130. The computer 110 may be programmed to iteratively detect shapes until shapes included in the shapes ground truth data are detected by the DNN 400 with a likelihood exceeding a specified threshold, e.g., 90%.

Following the block 960, the process 900 ends, or alternatively returns to the block 910, although not shown in FIG. 9.

Figure 10A:
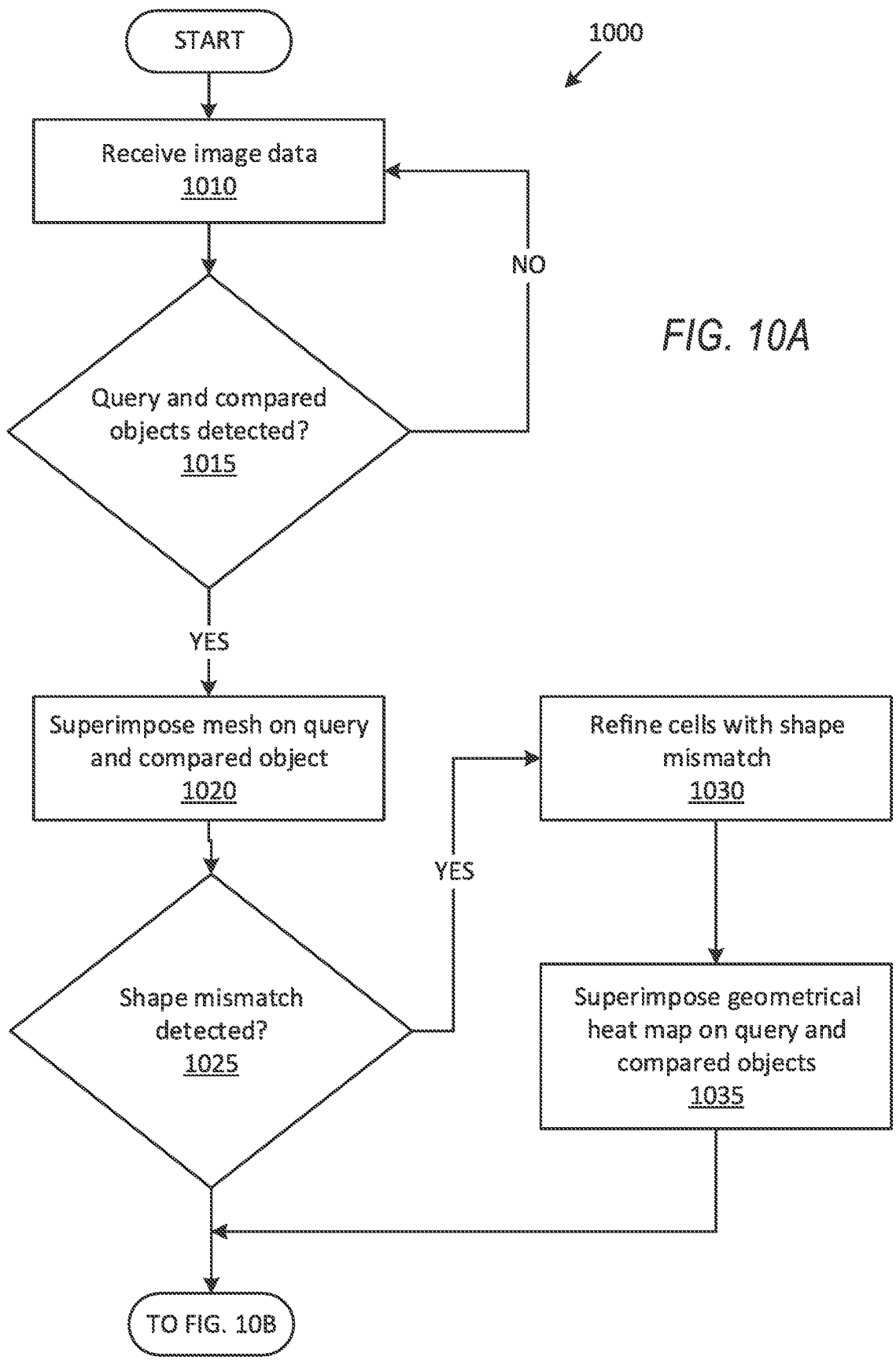
FIGS. 10A-10B are a flowchart of an example process for comparing the reference object to the query object.
Figure 10B:
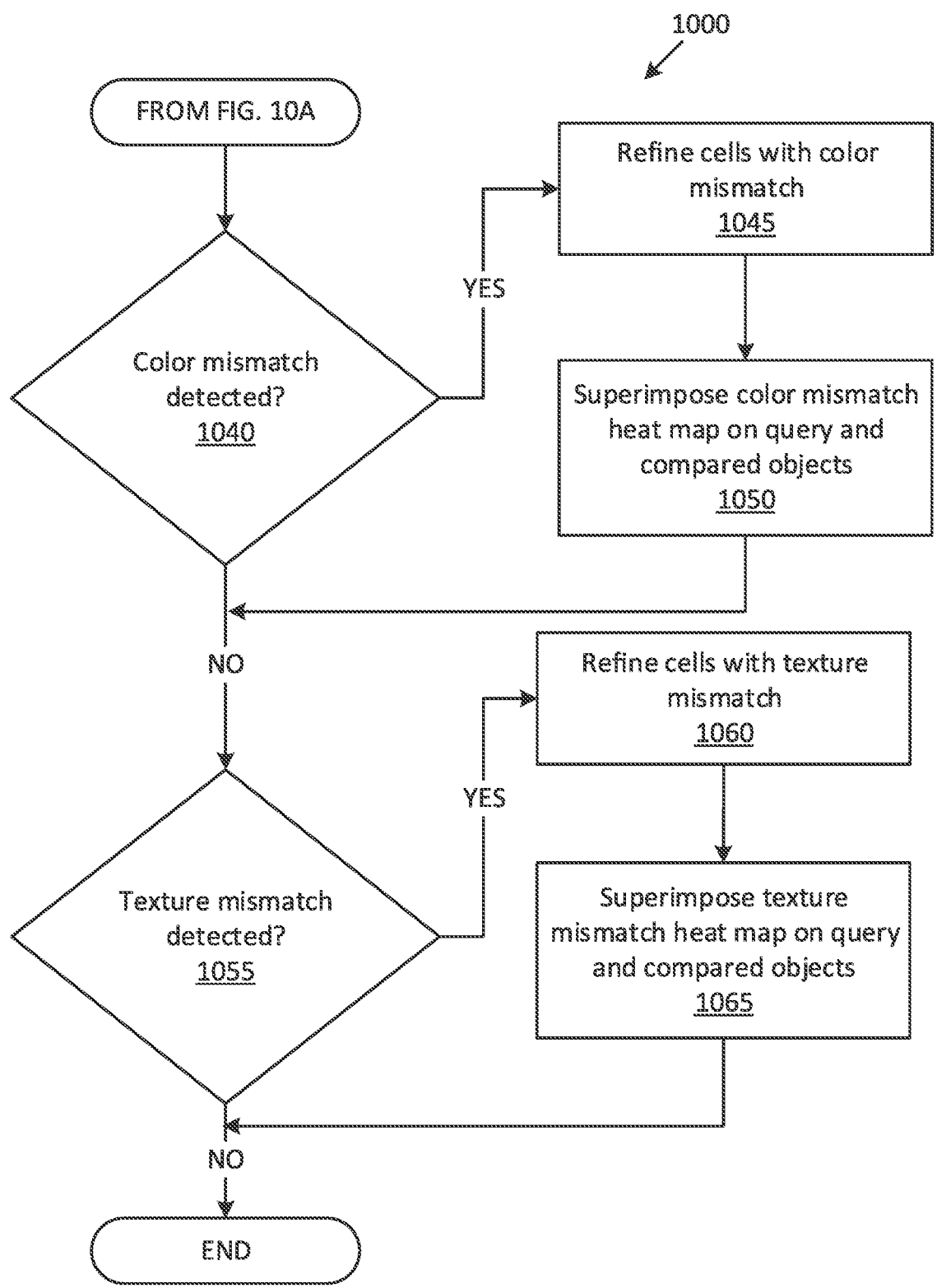

FIGS. 10A-10B are a flowchart of an example process 1000 for comparing a query object 150 and a reference object 150 and generating a heat map, e.g., geometrical heat map 500. The computer 110 may be programmed to execute blocks of the process 1000.

With reference to FIG. 10A, the process 1000 begins in a block 1010, in which the computer 110 receives image data, e.g., from the camera sensor 130. Additionally or alternatively, the computer 110 may be programmed to receive image data stored in the computer 110 memory 120 and/or to receive image data from a remote computer.

Next, in a decision block 1015, the computer 110 determines whether the query and reference objects 150 are detected in the received image data. In one example, the computer 110 may be programmed to detect the query and reference objects 150 of the camera sensor 130. In another example, the computer 110 may be programmed to detect the query object 150 in a first image, e.g., stored in the computer 110 memory 120, and the reference object 150 in a second image received from the camera sensor 130. If the computer 110 detects the query and the reference objects 150, the process 1000 proceeds to a block 1020; otherwise the process 1000 returns to the block 1010.

In the block 1020, the computer 110 superimposes a mesh 200 on each of the objects 150 in the received image data. The computer 110 may be programmed to generate the mesh 200 based on specified cell 210 dimensions $d_1$, $d_2$.

Next, in a decision block 1025, the computer 110 determines whether a shape mismatch is detected in at least a cell 210 of the mesh 200. The computer 110 may be programmed to detect a mismatch based on trained DNN 400 output such as described above. Additionally or alternatively, the computer 110 may be programmed to detect a shape mismatch using image processing techniques. For example, the computer 110 may be programmed to determine a fitted bounding box around shapes 240, 310 and determine an orientation angle of each shape 240, 310. The computer 110 may be programmed to detect a mismatch by determining dimensions of shapes on objects 150, and determine a shape mismatch based on the determined dimensions of the shapes, e.g., by determining that a shape mismatch quantifier MS determined based on Equations (1)-(3) exceeds a threshold such as 0.2. If the computer 110 detects a shape mismatch, then the process 1000 proceeds to a block 1030; otherwise the process 1000 proceeds to a decision block 1040 (see FIG. 10B).

In the block 1030, the computer 110 iteratively refines the shape mismatched cell(s) 210, stopping the refinement of the refined cell 210 of the object 150 results in a refined cell 210 that is matched to a corresponding refined cell 210 of the reference object 150. The computer 110 is programmed to determine a shape mismatch quantifier $M_S$ for the cells 210 of the mesh 200.

Next, in a block 1035, the computer 110 superimposes a geometrical heatmap, e.g., the heat map 500, on the reference object 150. Additionally or alternatively, the heat map 500 may be superimposed on the object 150 in the received image. The computer 110 may be programmed to determine a color of each cell 210 of the heat map 500 based on a determined shape mismatch quantifier $M_S$. Following the block 1035, the process 1000 proceeds to the block 1040 (See FIG. 10B).

With reference to FIG. 10B, in the decision block 1040, the computer 110 determines whether a color mismatch is detected. In one example, the computer 110 may be programmed to detect a color mismatch based on the DNN 400 output. The computer 110 may be programmed to determine a color mismatch quantifier $M_C$. The computer 110 may be programmed to determine a color mismatch upon determining that the color mismatch quantifier $M_C$ exceeds a threshold, e.g., 0.5. Alternatively, depending on a definition of a mismatch quantifier, the computer 110 may be programmed to determine a color mismatch upon determining that the quantifier is less than a threshold. If the computer 110 detects a color mismatch on the mesh 200, then the process 1000 proceeds to a block 1045; otherwise the process 1000 proceeds to a decision block 1055.

In the block 1045, the computer 110 refines the color mismatched cell(s) 210 in an iterative process and stop a refinement of the refined cell 210 of the object 150 results in a refined cell 210 that is matched to a corresponding refined cell 210 of the reference object 150. The computer 110 may be programmed to determine a color mismatch quantifier $M_C$ for the cells 210 of the mesh 200.

Next, in block 1050, the computer 110 superimposes a color mismatch heatmap, e.g., the color heat map 600, on the reference object 150. Additionally or alternatively, the heat map 500 may be superimposed on the object 150 in the received image. The computer 110 may be programmed to determine a color of each cell 210 of the heat map 500 based on a determined color mismatch quantifier $M_C$. Following the block 1050, the process 1000 proceeds to the decision block 1055.

In the decision block 1055, the computer 110 determines whether a texture mismatch is detected. In one example, the computer 110 may be programmed to detect a texture mismatch based on the DNN 400 output. The DNN 400 may output a probability of a detected texture for the cells 210 of the mesh 200. The computer 110 may be programmed to detect a texture mismatch based on the outputted probability of detected texture, as discussed above. If the computer 110 detects a texture mismatch on the mesh 200, then the process 1000 proceeds to a block 1060; otherwise the process 1000 ends, or alternatively returns to the block 1010, e.g., to compare another object 150 to the query object 150.

In the block 1060, the computer 110 refines the texture mismatched cell(s) 210 in an iterative process and stops a refinement of the refined cell 210 of the object 150 results in a refined cell 210 that is matched to a corresponding refined cell 210 of the reference object 150. The computer 110 may be programmed to determine a texture mismatch quantifier $M_T$ for the cells 210 of the mesh 200.

Next, in a block 1065, the computer 110 superimposes a texture mismatch heatmap, e.g., the heat map 800, on the reference object 150. Additionally or alternatively, the heat map 800 may be superimposed on the object 150 in the received image. The computer 110 may be programmed to determine a color of each cell 210 of the heat map 800 based on a determined texture mismatch quantifier $M_T$.

Following the block 1060, the process 1000 ends, or alternatively returns to the block 1010, e.g., to compare another object 150 to the query object 150.

As used herein, the adverb "substantially" means that a shape, structure, measurement, quantity, time, etc. may deviate from an exactly described geometry, distance, measurement, quantity, time, etc., because of imperfections in materials, machining, manufacturing, transmission of data, computational speed, etc.

"Based on" encompasses "based wholly or partly on." If, herein, a first thing is described and/or claimed as being "based on" the second thing, then the first thing is derived or calculated from the second thing, and/or output from an algorithm, process, or program function that accepts some or all of the second thing as input and outputs some or all of the first thing.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer that includes a processor and a memory, the memory storing instructions executable by the processor such that the computer is programmed to:
   detect a first and a second object in received image data;
   determine a mesh of cells on each of first and second object surfaces;
   upon identifying a cell of the mesh on the first object mismatched to a corresponding cell on the second object, refine the mismatched cell by dividing the mismatched cell into a plurality of smaller cells, wherein identifying the mismatch is based on at least one of a mismatch in a color, texture, shape, and dimensions;

stop refining the cell upon determining that a refinement of the refined cell of the first object results in a refined cell that is matched to a corresponding refined cell of the second object; and output location data of mismatched cells of the first and second objects, wherein a mismatched cell has at least one of a color mismatch, texture mismatch, and shape mismatch.

2. The system of claim 1, wherein the instructions further include instructions to identify a texture mismatch based on a neural network trained by a plurality of textures including leather, faux leather, fabric, and plastic.

3. The system of claim 2, wherein the neural network outputs, for each cell, a probability of each trained material.

4. The system of claim 1, wherein the instructions further include instructions to identify the mismatch in shape by determining a difference between a first minimal bounding box fitted around a first detected shape on the first object and a second minimal bounding box fitted around a second shape detected in a corresponding cell on the second object.

5. The system of claim 1, wherein the instructions further include instructions to identify the mismatch in shape based on an output of a trained neural network, wherein the received image data is inputted to the trained neural network.

6. The system of claim 1, wherein the instructions further include instructions to identify a first region of interest including a first shape on the first object and a second region of interest including a second shape on the second object and then perform pixel by pixel comparison to identify mismatches of the first and second shape.

7. The system of claim 1, wherein the instructions further include instructions to determine a dimension mismatch based on a reference scale included in the received image data.

8. The system of claim 1, wherein the instructions further include instructions to superimpose, on the first and second objects, one or more bounding boxes around cells including at least one of a color mismatch, shape mismatch, and texture mismatch.

9. The system of claim 1, wherein the instructions further include instructions to superimpose a heat map on an image of the second object, wherein each point of the heat map has a color that represents a mismatch quantifier for at least one of a color mismatch, shape mismatch, and texture mismatch.

10. A method, comprising:
detecting a first and a second object in received image data;

determining a mesh of cells on each of first and second object surfaces;

upon identifying a cell of the mesh on the first object mismatched to a corresponding cell on the second object, refining the mismatched cell by dividing the mismatched cell into a plurality of smaller cells wherein identifying the mismatch is based on at least one of a mismatch in a color, texture, shape, and dimensions;

stopping refining the cell upon determining that a refinement of the refined cell of the first object results in a refined cell that is matched to a corresponding refined cell of the second object; and outputting location data of mismatched cells of the first and second objects, wherein a mismatched cell has at least one of a color mismatch, texture mismatch, and shape mismatch.

11. The method of claim 10, further comprising identifying a texture mismatch based on a neural network trained by a plurality of textures including leather, faux leather, fabric, and plastic.

12. The method of claim 11, wherein the neural network outputs, for each cell, a probability of each trained material.

13. The method of claim 10, further comprising identifying the mismatch in shape by determining a difference between a first minimal bounding box fitted around a first detected shape on the first object and a second minimal bounding box fitted around a second shape detected in a corresponding cell on the second object.

14. The method of claim 10, further comprising identifying the mismatch in shape based on an output of a trained neural network, wherein the received image data is inputted to the trained neural network.

15. The method of claim 10, further comprising identifying a first region of interest including a first shape on the first object and a second region of interest including a second shape on the second object and then perform pixel by pixel comparison to identify mismatches of the first and second shape.

16. The method of claim 10, further comprising determining a dimension mismatch based on a reference scale included in the received image data.

17. The method of claim 10, further comprising superimposing, on the first and second objects, one or more bounding boxes around cells including at least one of a color mismatch, shape mismatch, and texture mismatch.

18. The method of claim 10, further comprising superimposing a heat map on an image of the second object, wherein each point of the heat map has a color that represents a mismatch quantifier for at least one of a color mismatch, shape mismatch, and texture mismatch.

* * * * *